United States Patent [19]

Nowak

[11] Patent Number: 5,199,321
[45] Date of Patent: Apr. 6, 1993

[54] ADJUSTABLE TERMINAL HAVING A CAM SURFACE ACTUATOR

[75] Inventor: Joseph M. Nowak, Berkley, Mich.

[73] Assignee: Teleflex Incorporated, Limerick, Pa.

[21] Appl. No.: 910,717

[22] Filed: Jul. 7, 1992

[51] Int. Cl.$^5$ ............................................... F16C 1/10
[52] U.S. Cl. ............................... 74/502.6; 74/501.5 R
[58] Field of Search ........................ 74/502.6, 501.5 R

[56] References Cited

U.S. PATENT DOCUMENTS

| 4,676,119 | 6/1987 | Spease | 74/502.6 |
| 4,903,541 | 2/1990 | Shiota | 74/502.6 X |
| 5,079,967 | 1/1992 | LaCava | 74/501.5 R |

Primary Examiner—Dirk Wright
Attorney, Agent, or Firm—Reising, Ethington, Barnard, Perry & Milton

[57] ABSTRACT

A motion transmitting remote control cable assembly (10) includes a core element (12) with a terminal body (14) fixed to one end. A sliding member (20) slides within the terminal body to extend the effective reach of the core element. The sliding member (20) includes one way ratcheting teeth (22) which engage teeth (18) disposed on the terminal body (14) to provide incremental adjustment of the sliding member with respect to the terminal body. The sliding member (20) includes a camming surfcae (24) disposed at its operative end for translating reciprocating linear motion of the core element (12) into reciprocating linear motion of a button (26) which moves in a path perpendicular to the motion of the core element.

19 Claims, 4 Drawing Sheets

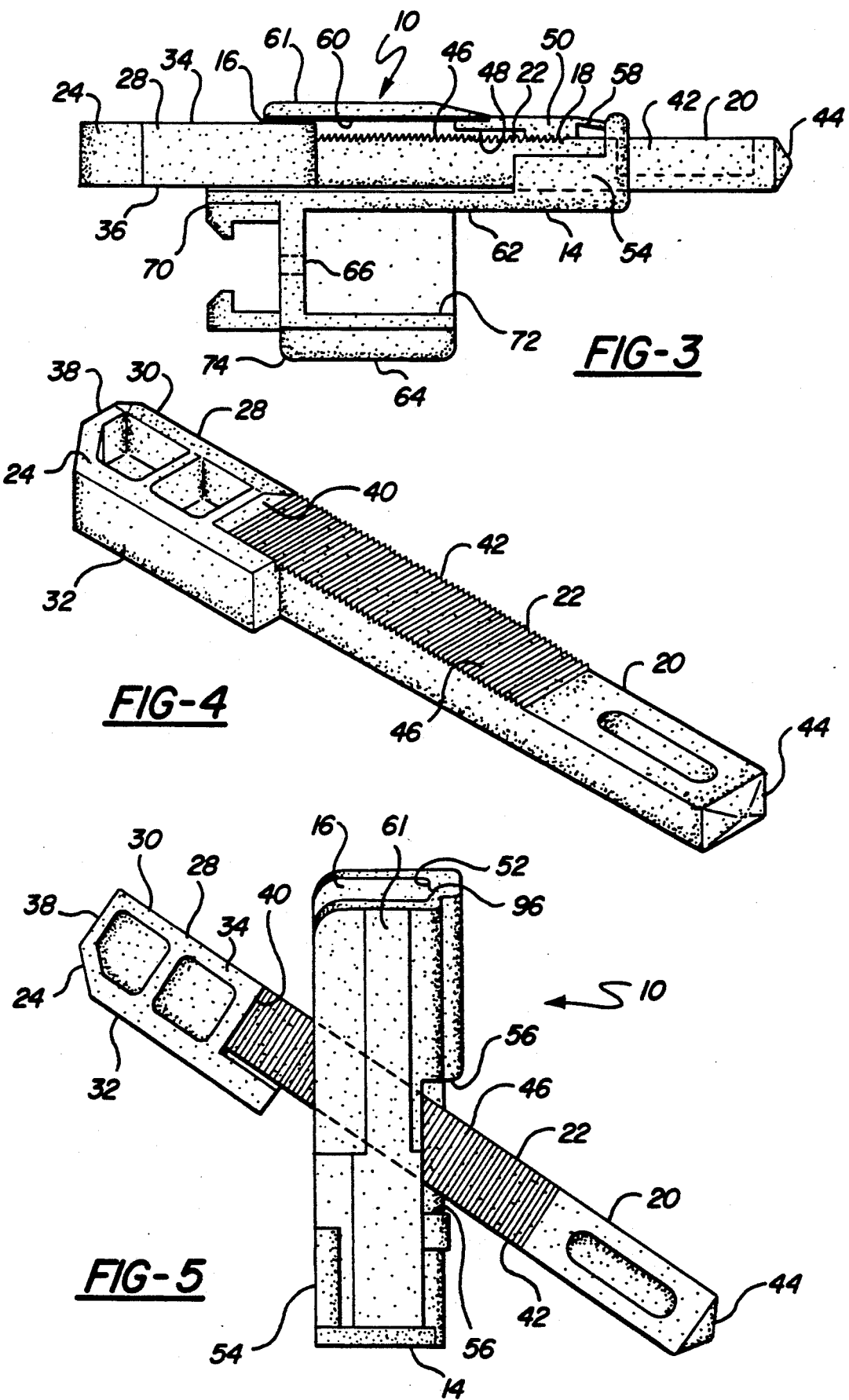

0
ADJUSTABLE TERMINAL HAVING A CAM SURFACE ACTUATOR

TECHNICAL FIELD

The subject invention relates to motion transmitting remote control cable assemblies of the type for transmitting motion in a curved path by means of a motion transmitting core element, and more particularly to terminals attached to an end thereof.

BACKGROUND OF THE INVENTION

In a specific push-pull application, it has become necessary to translate reciprocating (i.e. back and forth) motion along one line into reciprocating motion along a perpendicular line. A button protrudes from a flat surface over which a motion transmitting core element reciprocates. The core element requires a terminal or end fitting which will depress the button when the terminal passes linearly over the button, or alternatively, allow the button to pop back up when the terminal moves linearly away from the button. Until now, no terminal has been adapted to translate the back and forth motion of the core element into up and down motion of the button.

SUMMARY OF THE INVENTION

A motion transmitting remote control cable assembly for transmitting motion in a curved path comprises a core element having ends and a terminal body fixedly attached to and moveable with one of the ends of the core element. The terminal body includes a front end and a rear end and a passageway extending through the terminal body from the front end to the rear end and a set of ratcheting teeth disposed within the passageway. The assembly also includes an elongated sliding member slideably disposed in the passageway of the terminal body and having a plurality of spaced apart ratcheting teeth for engaging the ratcheting teeth in the passageway to provide incremental adjustment of the sliding member with respect to the terminal body. The assembly is characterized by camming means disposed at one end of the sliding member for translating reciprocating linear motion of the sliding member into perpendicular reciprocating linear motion of a button disposed in the reciprocating path of the sliding member.

FIGURES IN THE DRAWINGS

Other advantages of the present invention will be readily appreciated as the same becomes better understood by reference to the following detailed description when considered in connection with the accompanying drawings wherein:

FIG. 3 is a bottom view of the sliding member disposed within the terminal body;

FIG. 4 is a perspective view of the sliding member;

FIG. 5 is a side view of the sliding member being inserted into the terminal body;

DETAILED DESCRIPTION OF THE PREFERRED EMBODIMENT

Figure 1:
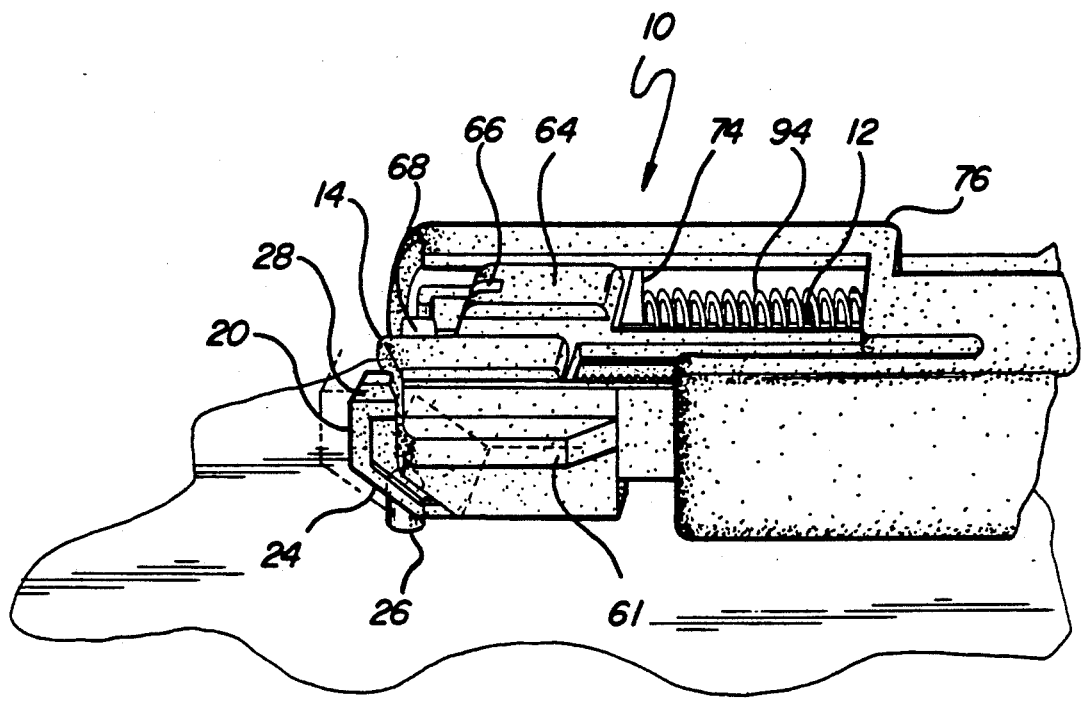
FIG. 1 is a perspective view of the subject invention in a retracted position with respect to a button over which the invention reciprocates.
Figure 2:
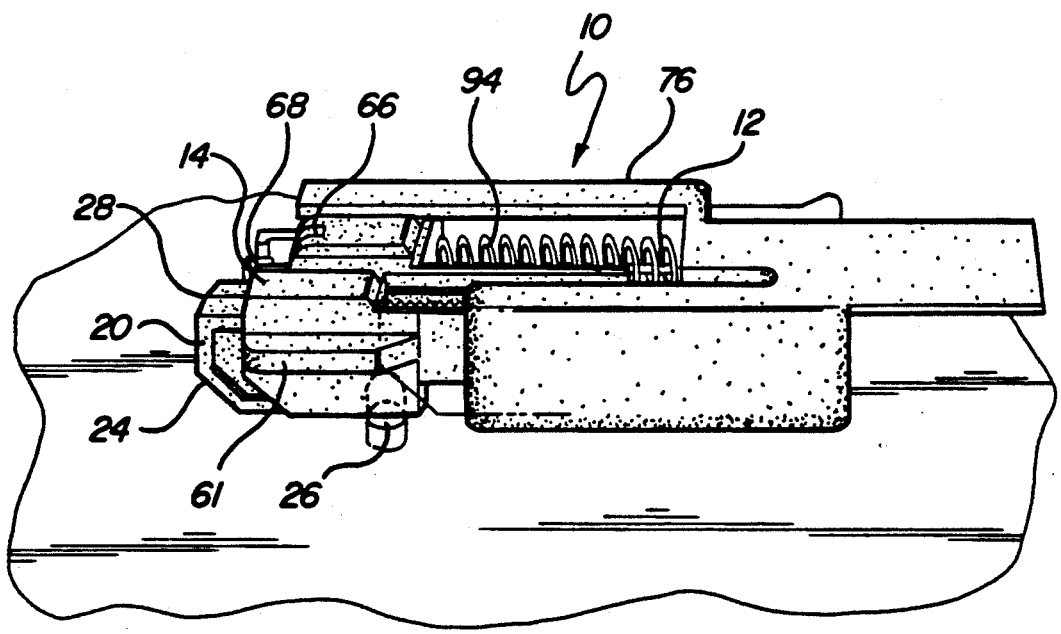
FIG. 2 is a perspective view of the subject invention in an extended position with respect to the button over which the invention reciprocates.
Figure 6:
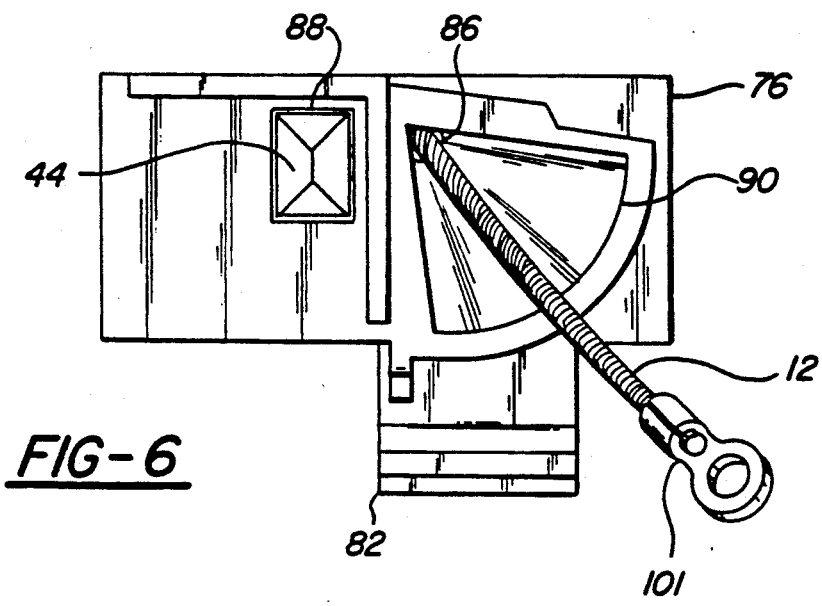
FIG. 6 is a rear view of the housing member showing the core element and the tail of the sliding member.
Figure 8:
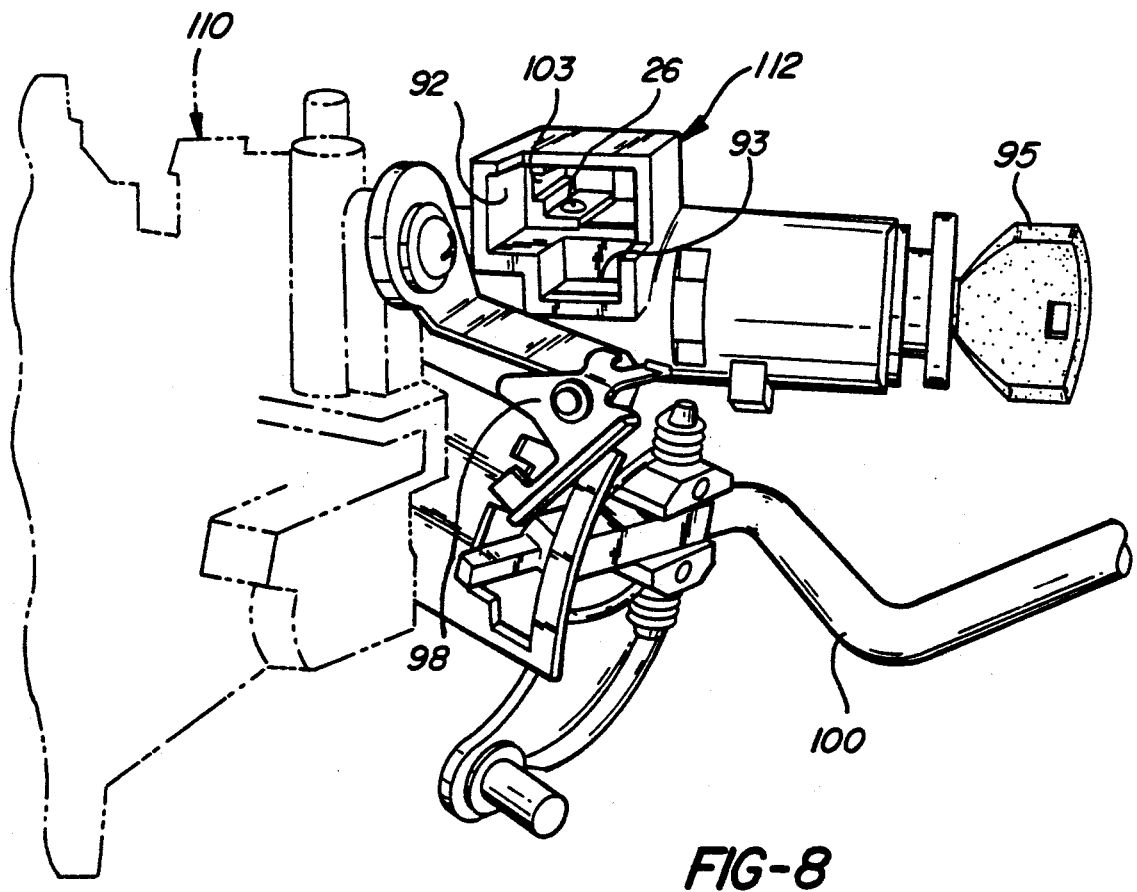
FIG. 8 is a perspective view of the portion of the steering column in which the subject invention operates.
Figure 7:
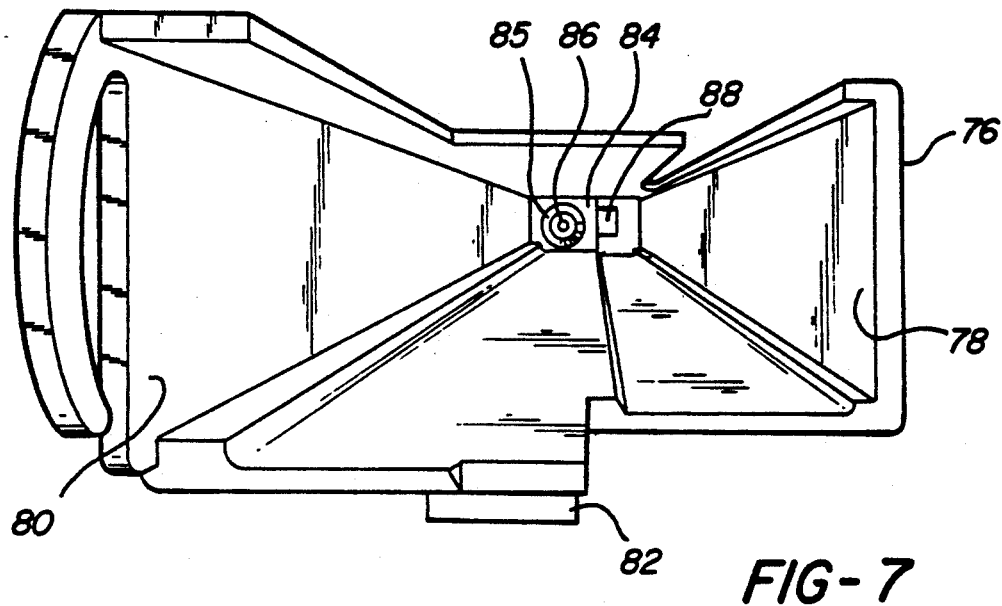
FIG. 7 is a front view of the housing member with the terminal body, sliding member, spring and core element removed.
Figure 9:
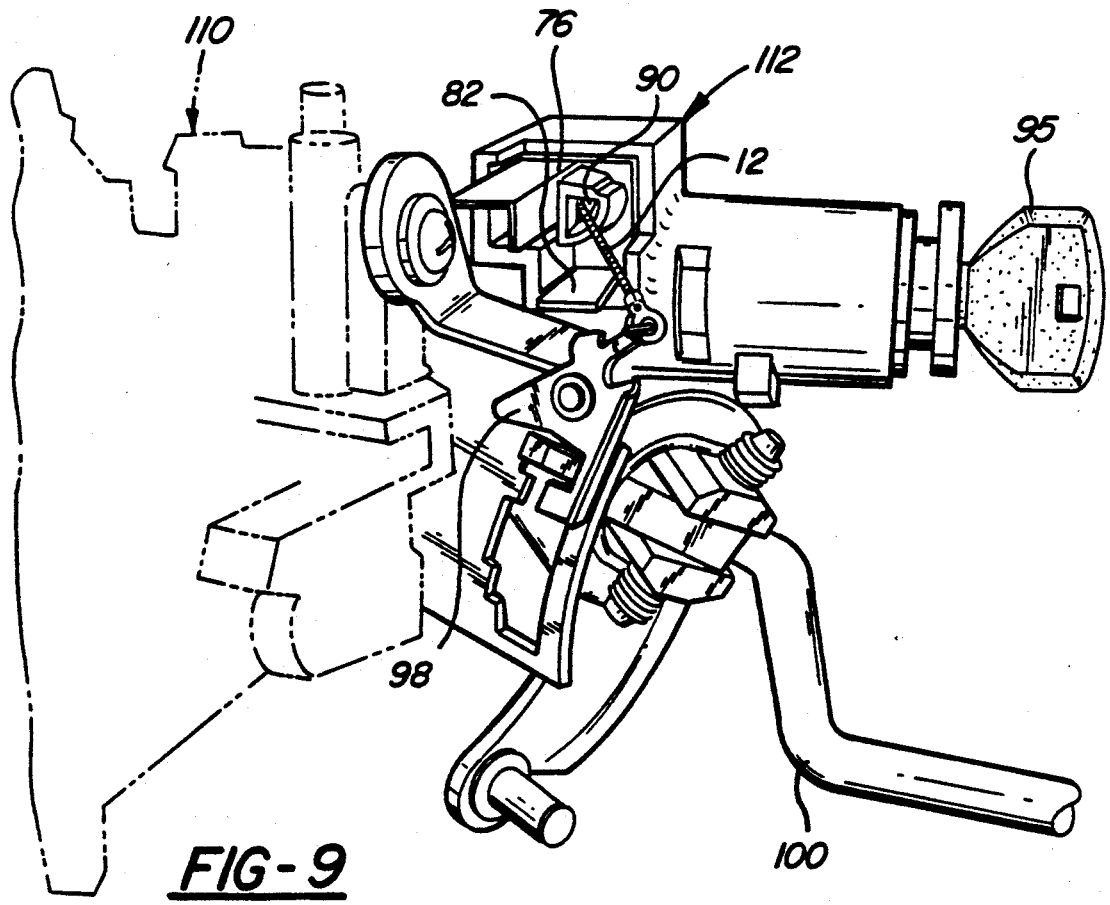
FIG. 9 is the same view as FIG. 8 with the housing member inserted in the steering column.

A motion transmitting remote control cable assembly generally shown at 10 for transmitting motion in a curved path generally comprises a core element 12 having first and second ends and a terminal body 14 fixedly attached to and moveable with one of the ends of the core element. The terminal body 14 includes a front end and a rear end and a passageway 16 extending through the terminal body 14 from the front end to the rear end. There is a set of ratcheting teeth 18 disposed within the passageway 16. The assembly 10 also includes a elongated sliding member 20 slideably disposed in the passageway 16 of the terminal body 14 and having a plurality of spaced apart ratcheting teeth 22 for engaging the ratcheting teeth 18 in the passageway 16 to provide incremental adjustment of the sliding member 20 with respect to the terminal body 14. The new assembly 10 is generally characterized by camming means 24 disposed at one end of the sliding member 20 for translating reciprocating linear motion of the sliding member into perpendicular reciprocating linear motion of a button 26 disposed in the reciprocating path of the sliding member 20.

The camming means 24 includes an elongated cam surface 24 for progressively depressing the button 26 as the sliding member 20 slides thereover. The sliding member 20 includes a cam head 28 including a top side 30, an oppositely disposed bottom side 32, a first side 34, an oppositely disposed second side 36, a camming end 38 and an oppositely disposed back end 40. The cam surface 24 extends upwardly from the bottom side 32 to the camming end 38. The cam surface 24 is a substantially flat surface forming an obtuse angle with the bottom side 32. Said another way, the cam surface 24 cuts the corner between the bottom side 32 and the camming end 38, which exist in perpendicular planes. The cam surface 24 is thus angled with respect to the bottom side 32. The cam surface 24 is so aligned in order to present an angled surface to the button 26. If the camming means 24 presented only a flat, i.e. vertical surface, or one parallel to the direction of the button's reciprocation, the camming means would only abut against the button 26—and not depress it. The idea behind the angled surface of the cam is to translate the force of the sliding member 20 into a force in the perpendicular direction which will depress the button 26. The cam surface 24 is angled so that when it touches the button 26 it will impart a force having a component of force which will depress the button.

The sliding member 20 includes an elongated tail 42 extending from the back end 40 of the camming head 28 to a remote end 44. The tail 42 includes a top side, a bottom side, a toothed side 46 including the ratcheting teeth 22 disposed therealong, and an oppositely disposed smooth side. The toothed side 46 of the tail 42 is recessed from the first side 34 of the camming head 28 so that the toothed side and the terminal body 14 are spaced apart to define a clearance space 48. In other words, the camming head 28 is thicker than the tail 42, at least to the extent that it extends farther across the passageway 16 than the tail. In the preferred embodiment, the camming head 28 extends completely across the passageway 16.

The camming means 24 includes a width dimension greater than the width of the button 26 to accommodate a predetermined variation in the placement of the sliding member 2 with respect to the button 26. This provides a degree of tolerance whereby if the path of the sliding member 20 and the terminal body 14 does not perfectly intersect the path of the button 26, the sliding member 20 will still depress the button. There will be some variation in the placement of the subject assembly 10 with respect to the button 26. The idea behind making the camming means 24, specifically the cam surface 24, wide with respect to the button 26, is to minimize or eliminate the chance that the sliding member 20 will not depress the button when the sliding member reciprocates over the button.

The ratcheting teeth 18 in the passageway 16 are disposed on a protruding head 50 protruding from the terminal body 14 across the clearance space 48 to engage the ratcheting teeth 22 on the tail 42 whereby the protruding head 50 blocks the camming head 28 of the sliding member 20 from moving therepast. As has been said earlier, the camming head 28 extends farther across the passageway 16 than does the tail 42. Since the protruding head 50 extends across the passageway 16 far enough to contact the teeth 22 on the tail 42, the protruding head 50 must necessarily block the movement of the camming head 28 in the direction of the rear end. The idea behind this arrangement of the camming head, the tail 42 and the teeth is to solve two problems while making the most efficient use of space. After all, the environment in which the assembly 10 operates, the steering column of an automobile, is very confined. The two problems referred to are 1) providing a degree of lateral tolerance (discussed above) in the cam surface 24 by making it as wide as possible, and 2) providing a degree of axial adjustment to enable the sliding member 20 to move axially vis-a-vis the terminal body 14 and the core element 12 to insure that the cam surface 24 will depress the button 26 when the sliding member 20 reciprocates.

The terminal body 14 includes a top wall 52 extending from the front end toward the rear end and a bottom wall 54 extending from the rear end toward the front end. The top wall 52 does not reach the rear end; nor does the bottom wall 54 reach the front end. Thus, the top and bottom walls 52,54 are spaced apart along the passageway 16 on opposite sides of the passageway to define a transaxial passageway 56 extending through the terminal body 14 across the passageway 16 to receive the sliding member 20 into the terminal body and allow the sliding member 20 to rotate across the passageway 16 of the terminal body 14 until the sliding member and the terminal body are aligned co-axially with the top side 30 of the sliding member abutting the top wall 52 of the terminal body 14, with the bottom of the tail 42 abutting the bottom wall 54 of the terminal body and with the ratcheting teeth 22 on the tail 42 engaging the ratcheting teeth 18 on the protrusion. A practitioner skilled in the art will appreciate that this method of inserting the sliding member 20 into the terminal body 14 is the only way to do so. This is because the protruding head 50 blocks the passageway 16 for the camming head—so the camming head could not be inserted at the rear end of the terminal. Also, the ratcheting teeth 22 on the sliding member 20 and the protruding head 50 prevent the sliding member from being inserted into the front end of the terminal body 14 in tail-first fashion. This is because the ratcheting teeth 18 on the protruding head 50 and the sliding member 20 are angled so that the sliding member may only ratchet in the direction of the front end of the terminal.

The protruding head 50 is supported on the terminal body 14 with a leaf spring 58 to bias the protruding head into engagement with the ratcheting teeth 22 of the sliding member 20 and to allow the protruding head to deflect from the sliding member when the sliding member is inserted into the terminal body 14. In effect, the leaf spring 58 forms part of one of the sides of the terminal body 14.

The terminal body 14 includes a first side 60 and a spaced apart second side 62, where the protruding head 50 protrudes inwardly from the first side. The first side 60 also includes a first guide block 61 extending outwardly therefrom. The first guide block 61 has a rectangular, box-like shape and is thus adapted to slide along a channel-like track. This guide block 61 guides the reciprocation of the terminal body 14 in a track in the steering column in which the assembly 10 fits. The second side 62 includes a block 64 extending beyond the second side 62 of the terminal body 14 adjacent the front end. The block 64 includes a first end adjacent the front end and an oppositely disposed rear end. The block 64 defines a passage 66 extending from the rear end of the block through to the front end of the block, with the end of the core element 12 being disposed through the passage.

The end of the core element 12 includes an enlargement 68 abutting against the front end of the block 64 and preventing the end of the core element from being pulled through the block.

The block 64 includes first and second crab claws 70 disposed on the front end on opposite sides of the passageway 66. The crab claws 70 each include a flange extending toward the other crab claw retaining the enlargement 68 against the front end of the block 64. The block 64 defines an annular space 72 around the passageway 66 extending from the rear end partially toward the front end.

Thus, one will appreciate that the sliding member 20 is attached in off-axis fashion from the core element 12. In other words the sliding member 20 is generally parallel (at least toward the end attached to the terminal) with the core element 12, which is slightly spaced apart from the sliding member.

The block 64 finally includes a second guide block 74 disposed on the side of the side of the block opposite the second side of the terminal body 14. The second guide block 74 has a rectangular, box-like shape, and is thus adapted to slide along a channel-like track.

The assembly 10 further includes a hollow housing 76 defining a passageway 78 for slideably supporting the terminal body 14 and the sliding member 20 as these two parts reciprocate over the button 26. The walls of the passageway 78 define a track 80 along which the sliding member 20 and the terminal body 14 slide to restrict the movement of these two elements to linear movement back and forth over the button 26. The track 80 is a channel in one side of the housing 76 which slideably receives the second guide block 74 on the terminal body 14. The track 80 prevents the sliding member 20 and particularly the cam surface 24 from deflecting away from the button 26 when the cam surface 24 engages the button. The housing 76 includes a clip 82 for clipping the housing into fixed relationship with the button 26 over which the terminal reciprocates. The terminal body 14 and the sliding member 20 are disposed into a first end of the housing 76 which is open to enable these pieces to project out of the housing. The other end of the housing 76, the second end, is partially closed to define an abutment 84. There is a relatively small hole 86 through the abutment 84 to allow the core element 12 to pass through the housing. In the preferred embodiment, there is a spring seat 85 having a tubular shape which extends partly into the center of a coil spring for supporting the spring. In this situation, the hole 86 extends through the spring seat 85 to allow the core element to pass through. The second end also defines another hole 88 for enabling the tail 42 of the sliding member 20 to pass through the housing 76. The housing 76 finally includes a conduit 90 for the core element 12 extending from the second end. The conduit 90 is flared at its remote end to support the core element 12 in case it curves.

The terminal body 14 and the sliding member 20 are used in a small box-shaped space 92 in a steering column. This is where the button 26 is disposed. The hollow housing 76 has a congruent box-like shape such that it fits into this space 92 and clips to the steering column.

The assembly 10 also includes a coil spring 94 interposed around the core element 12 and having a first end abutting the housing 76 and a second end abutting the block 64 of the terminal body 14 so that the second end of the spring 94 is disposed in the annular passageway 66 in the block 64 abutting the block and so that the spring biases the terminal body 14 through the passageway 78 away from the second end of the spring and into engagement with the button 26 when the housing 76 is clipped into place with respect to the button. The spring abuts the abutment 84 whereby the small hole 86 is centered within the spring.

The main elements of the subject invention, including the sliding member 20, the terminal body 14 and the housing 76 are made from hard plastic, though other suitable materials will suffice. The top wall 52 of the terminal body 14 includes a channel 96 extending from the front end to the rear end for providing clearance for a parting line on the sliding member 20.

As has been noted, the assembly 10 operates within the context of a steering column generally indicated at 110. The assembly 10 works together with a larger mechanism generally indicated at 112 which prevents a driver from removing the ignition key 95 from the ignition unless the automatic transmission control arm 100 is in the "park" position. The housing 76 slides into the space 92 in the steering column 110 and clips into engagement with the steering column when the clip 82 clips into a clip hole 93. Once the housing 76 is secured in place, the core element 12 is attached at one end to a lever 98 which interacts with the transmission control arm 100. The core element includes a ring 101 attached to this end to facilitate attachment to the lever 98. The walls of the space 92 define a channel-like track 103 which guides the first guide block 61 as it reciprocates in the track 103. Thus, as the terminal body 14 reciprocates in the space 92 it is guided in the track 103 in the steering column 110 and the track 80 in the housing 76. The core element 12 is attached at its other end to the terminal body 14 and thus the sliding member 20. If the transmission arm 100 is in the "park" mode, the transmission arm depresses the lever 98; the lever in turn pulls the core element 12, overcoming the biasing force of the spring 94; and this in turn pulls the terminal body 14 and the sliding arm away from the button 26. If the button 26 is not blocked by the sliding member 20, as is here the case, the key 95 may be removed from the ignition. Alternatively, if the transmission arm 100 is not in "park," the lever 98 is not depressed and the spring 94 will be free to bias the terminal body 14 and the sliding member 20 over the button 26, which depresses the button and keeps the button depressed. The button 26 thus activates a lock (not shown) within the steering column which prevents the key 95 from being removed from the ignition.

The invention has been described in an illustrative manner, and it is to be understood that the terminology which has been used is intended to be in the nature of words of description rather than of limitation.

Obviously many modifications and variations of the present invention are possible in light of the above teachings. It is therefore to be understood that within the scope of the appended claims wherein reference numerals are merely for convenience and are not to be in any way limiting, the invention may be practiced otherwise than as specifically described.

We claim:

1. A motion transmitting remote control cable assembly (10) for transmitting motion in a curved path comprising:
   a core element (12) having ends;
   a terminal body (14) fixedly attached to and moveable with one of said ends of said core element (12), said terminal body including a front end and a rear end and a passageway (16) extending through said terminal body (14) from said front end to said rear end and a set of ratcheting teeth (18) disposed within said passageway (16);
   an elongated sliding member (20) slideably disposed in said passageway (16) of said terminal body (14) and having a plurality of spaced apart ratcheting teeth (22) for engaging said ratcheting teeth (18) in said passageway (16) to provide incremental adjustment of said sliding member (20) with respect to said terminal body (14);
   characterized by camming means (24) disposed at one end of said sliding member (20) for translating reciprocating linear motion of said sliding member into perpendicular reciprocating linear motion of a button (26) disposed in the reciprocating path of said sliding member (20).

2. An assembly (10) as set forth in claim 1 further characterized by said camming means (24) including an elongated cam surface (24) for progressively depressing the button (26) as said sliding member (20) slides thereover.

3. An assembly (10) as set forth in claim 2 further characterized by said sliding member (20) including a cam head (28) having a top side (30), an oppositely disposed bottom side (32), a first side (34), an oppositely disposed second side (36), a camming end (38) and an oppositely disposed back end (40), said cam surface (24) extending upwardly from said bottom side (32) to said camming end (38).

4. An assembly (10) as set forth in claim 3 further characterized by said cam surface (24) being a substantially flat surface forming an obtuse angle with said bottom side (32).

5. An assembly (10) as set forth in claim 4 further characterized by said sliding member (20) including a elongated tail (42) extending from said back end (40) of said camming head (38) to a remote end (44), said tail including a top side, a bottom side, a toothed side (46) including said ratcheting teeth (22) disposed therealong, and an oppositely disposed smooth side.

6. An assembly (10) as set forth in claim 5 further characterized by said toothed side (46) of said tail (42) being recessed from said first side (34) of said camming head (38) so that said toothed side and said terminal body (14) are spaced apart to define a clearance space (48).

7. An assembly (10) as set forth in claim 1 further characterized by said camming means (24) including a width dimension greater than the width of the button (26) to accommodate a predetermined variation in the placement of said sliding member (20) with respect to the button (26).

8. An assembly (10) as set forth in claim 6 further characterized by said ratcheting teeth (18) in said passageway (16) being disposed on a protruding head (50) protruding from said terminal body (14) across said clearance space (48) to engage said ratcheting teeth (22) on said tail (42) whereby said protruding head (50) blocks said camming head (38) of said sliding member (20) from moving therepast.

9. An assembly (10) as set forth in claim 8 further characterized by said terminal body (14) including a top wall (52) extending from said front end toward said rear end and a bottom wall (54) extending from said rear end toward said front end, said top and bottom walls (52,54) being spaced apart along said passageway (16) on opposite sides of said passageway to define a transaxial passageway (56) extending through said terminal body (14) across said passageway (16) to receiving said sliding member (20) into said terminal body and allowing said sliding member (20) to rotate across said passageway (16) of said terminal body (14) until said sliding member and said terminal body are aligned co-axially with said top side (30) of said sliding member (20) abutting said top wall (52) of said terminal body (14), with said bottom side (32) of said tail (42) abutting said bottom wall (54) of said terminal body and with said ratcheting teeth (22) on said tail engaging said ratcheting teeth (18) on said protrusion.

10. An assembly (10) as set forth in claim 9 further characterized by said protruding head (50) being supported on said terminal body (14) with a leaf spring (58) to bias said protruding head into engagement with said ratcheting teeth (22) of said sliding member (20) and to allow said protruding head (50) to deflect from said sliding member when said sliding member (20) is inserted into said terminal body (14).

11. An assembly (10) as set forth in claim 10 further characterized by said ratcheting teeth (18) on said protruding head (50) and said sliding member (20) being angled so that said sliding member (20) may only ratchet in the direction of said front end of said terminal body (14).

12. An assembly (10) as set forth in claim 11 further characterized by said terminal body (14) including a first side (60) and a spaced apart second side (62) where said protruding head (50) protrudes from said first side, said second side including a block (64) extending beyond said second side of said terminal body (14) adjacent said front end, said block (64) including a first end adjacent said front end and an oppositely disposed rear end.

13. An assembly (10) as set forth in claim 12 further characterized by said block (64) defining a passage (66) extending from said rear end of said block through to said front end of said block, said end of said core element (12) being disposed through said passage.

14. An assembly (10) as set forth in claim 13 further characterized by said end of said core element (12) including an enlargement (68) abutting against said front end of said block (64) and preventing said end of said core element from being pulled through said block.

15. An assembly (10) as set forth in claim 14 further characterized by said block (64) including first and second crab claws (70) disposed on said front end on opposite sides of said passageway (66), said crab claws each including a flange extending toward the other crab claw retaining said enlargement (68) against said front end of said block (64).

16. An assembly (10) as set forth in claim 15 further characterized by said block (64) defining an annular space (72) around said passageway (66) extending from said rear end partially toward said front end.

17. An assembly (10) as set forth in claim 4 further characterized by including a hollow housing (76) defining a passageway (78) for slideably supporting said terminal body (14) and said sliding member (20) as said terminal body and said sliding member reciprocate over the button (26).

18. An assembly (10) as set forth in claim 17 further characterized by said housing (76) including a clip (82) for clipping said housing into fixed relationship with the button (26) over which said terminal body (14) and said sliding member (20) reciprocate.

19. An assembly (10) as set forth in claim 18 further characterized by including a coil spring (94) interposed around said core element (12) and having a first end abutting said housing (76) and a second end abutting said block (64) of said terminal body (14) so that said second end of said spring (94) is disposed in said annular passageway (66) in said block (64) abutting said block and so that said spring biases said terminal body (14) through said passageway away from said second end of said spring and into engagement with the button (26) when said housing (76) is clipped into place with respect to the button.

* * * * *